April 20, 1954

M. C. SPENCER 2,676,292

ALTERNATING CURRENT MOTOR CONTROL

Filed Aug. 1, 1944

INVENTOR
MILLARD COLE SPENCER
BY
Pennie, Davis, Marvin and Edmonds
ATTORNEYS

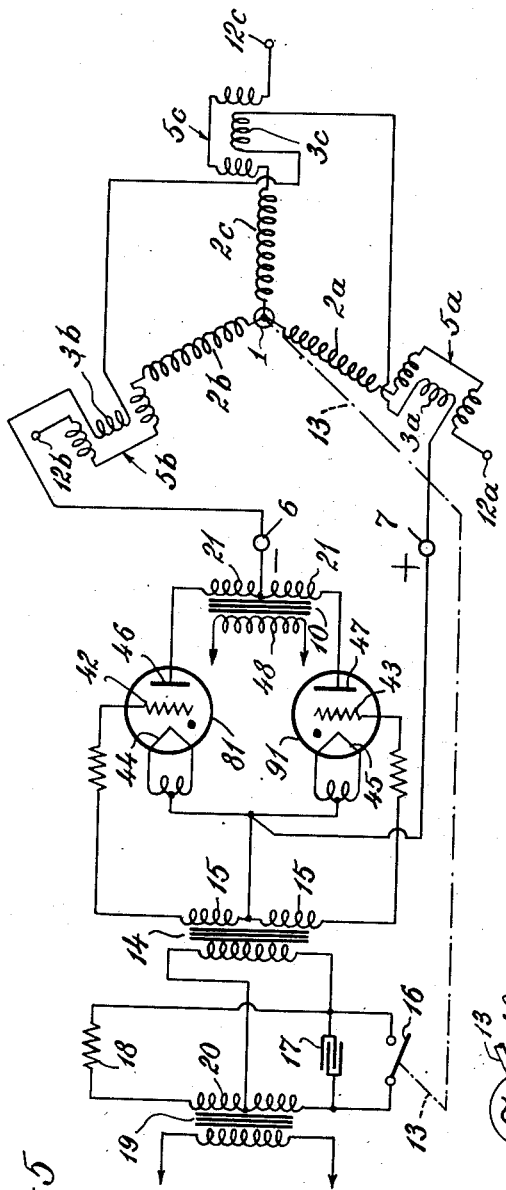

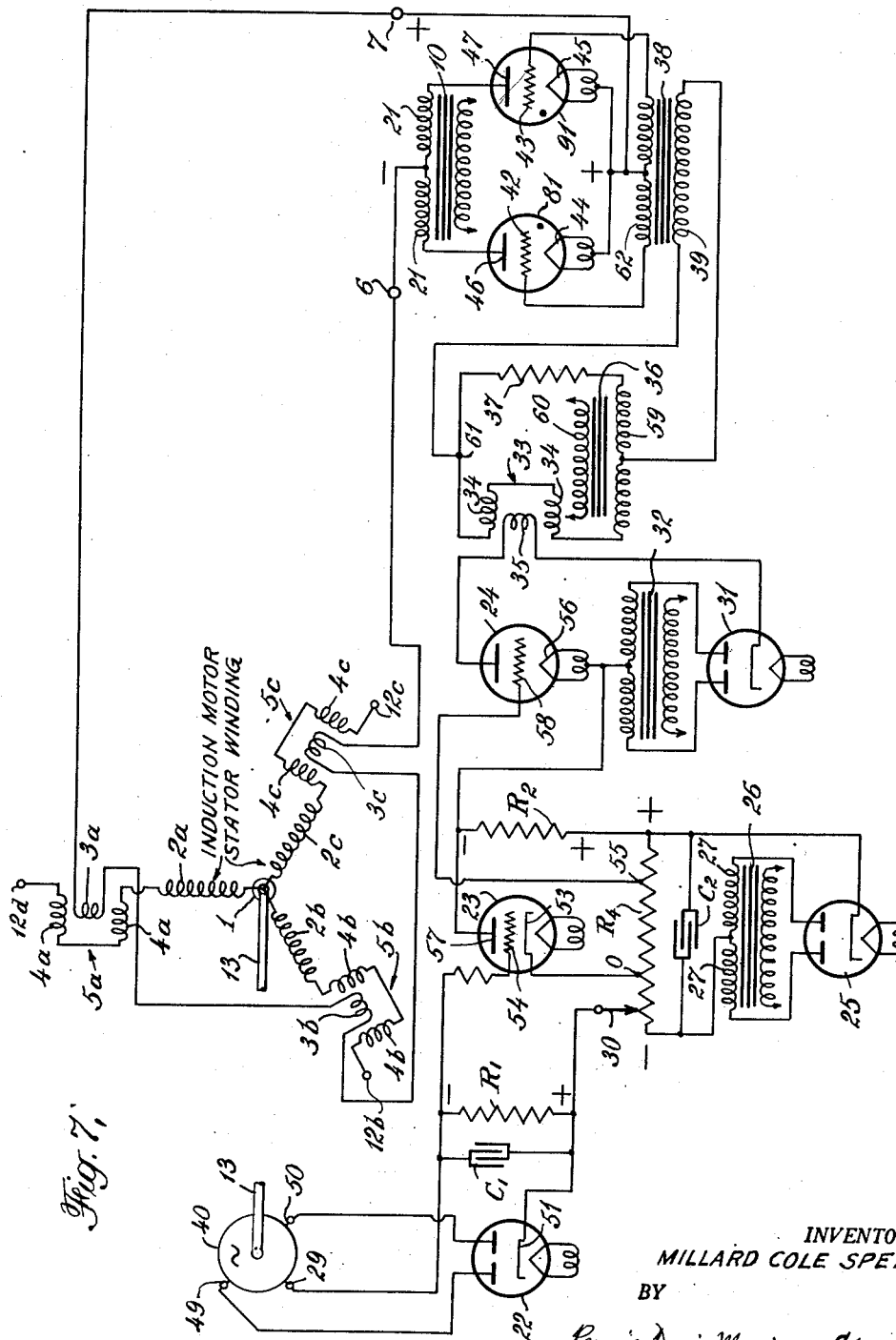

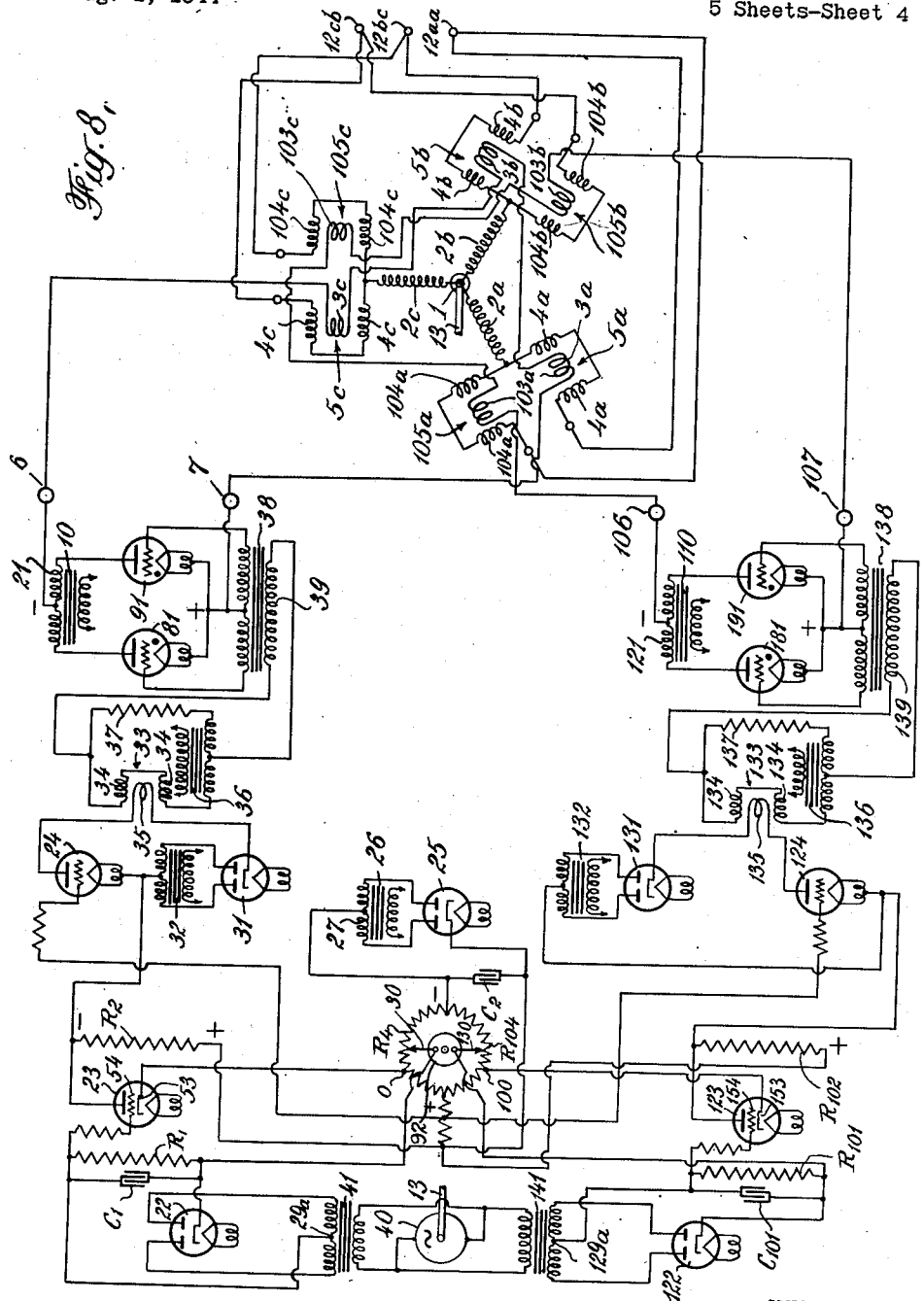

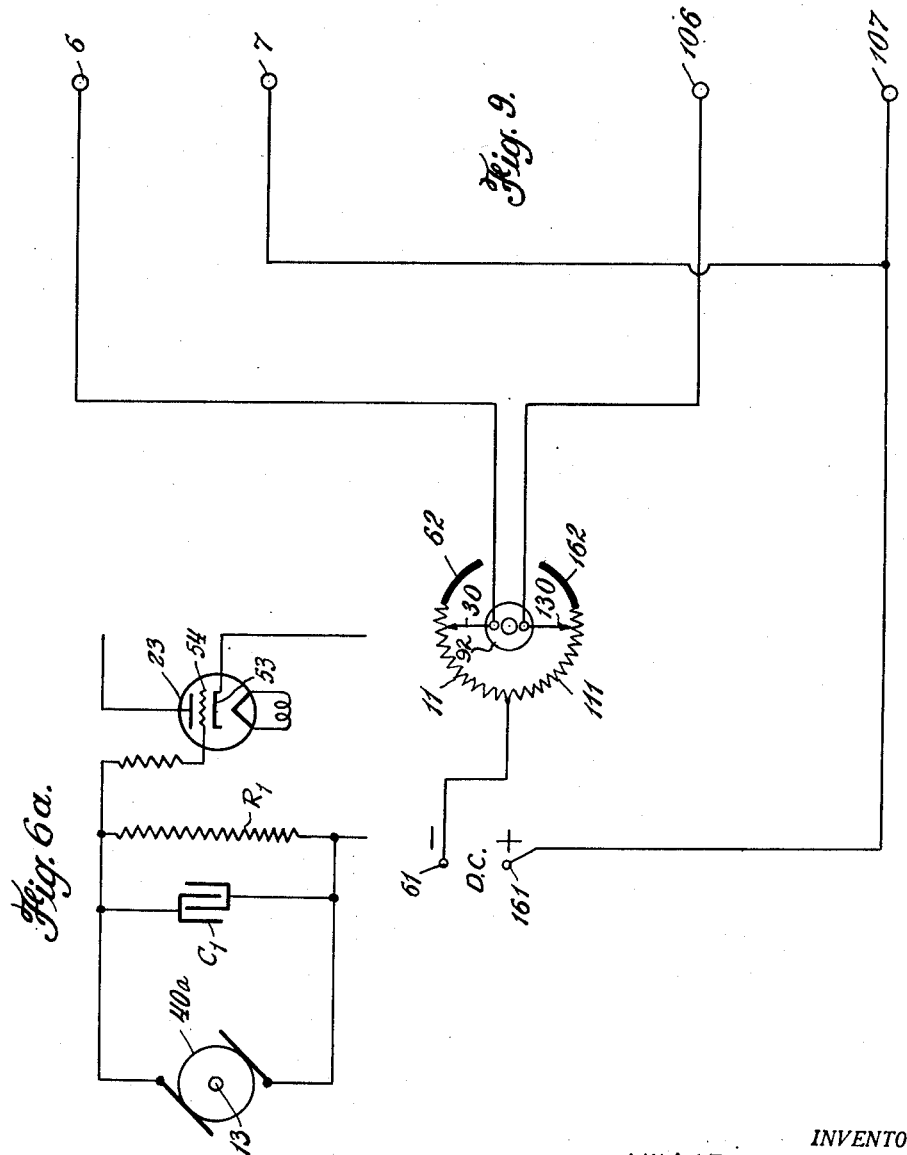

Patented Apr. 20, 1954

2,676,292

UNITED STATES PATENT OFFICE 2,676,292

ALTERNATING CURRENT MOTOR CONTROL

Millard Cole Spencer, East Orange, N. J., assignor, by mesne assignments, to Elliott Company, Jeannette, Pa., a corporation of Pennsylvania Application August 1, 1944, Serial No. 547,526

27 Claims. (Cl. 318—229)

This invention relates to the control of electric motors and especially to the control of the speed as well as the direction of rotation of alternating current motors of the induction type.

The satisfactory control of the speed of alternating current motors is well known to be difficult, and, therefore, it has been customary in the art to employ expedients in the nature of compromises, or to avoid the problem altogether by the use of direct current motors. However, the advantages inherent in alternating current power systems, and likewise in alternating current motors are so great that the commercial development of alternating current systems has greatly outgrown that of direct current systems. One of the chief advantages in direct current power systems, which prior to the present invention has not been satisfactorily duplicated in alternating current systems, has been the facility with which the speed of direct current motors could be controlled. By means of this invention it now becomes possible not only satisfactorily to control the speed of alternating current induction motors, but likewise the direction of rotation of such motors. By means of the invention it is feasible to control the speed of single phase and multi-phase motors, and the direction of rotation and speed of multi-phase motors.

Many of the advantages of an alternating current motor of which the speed as well as the direction of rotation may readily be controlled, remotely if desired, will at once occur to those skilled in the art. However, a few of the more important advantages introduced by the present invention may here be stated. The motor may, if desired, be of the squirrel cage type which is of great simplicity, eliminating commutator, brushes and slip rings. The speed may be adjusted at will from zero to full speed continuously throughout the speed range with shunt motor characteristics, viz., at each speed setting of the control, the motor speed is substantially independent of the load, and, furthermore, operation at full load torque at all speeds is possible. With but a single control device, the motor may be reversed and the same speed control attained in the reverse direction. High loads (for example 200% or more) can be carried for a substantial period of time because the control system per se does not carry the motor current, and high starting torques (for example 300%) can be developed. For the same reason almost all of the components of a given control system in accordance with the invention may be employed with motors of any power rating. Finally, by means of the present invention the motor may be stopped and started and the speed controlled from zero to maximum, in either direction, and remotely if desired, without opening or closing the power line to the motor and without actuating any moving parts which carry motor current.

The number of uses to which motors having the advantages of control above described may be put is very great, but among them may be mentioned drives for machine tools, knitting machines, fans and centrifugal pumps, gun turrets both for ships and aircraft, and a wide variety of traction applications.

Briefly, the invention comprises an induction motor of which the secondary winding or rotor preferably has certain characteristics in respect to those of the load, a reactor in series in each lead between the line and the motor stator winding, and a novel control circuit therefor whereby the speed of the motor may be adjusted and controlled over a wide range of speed and load by adjusting the voltage applied to the motor stator winding by varying the effective reactance of the reactor or reactors. In a preferred modification the invention comprises means including at least one direct-current controlled saturable core reactor, and electronic components for automatically deriving a direct current voltage proportional to the speed of the motor to be controlled so that if this voltage becomes more or less than that representing the preselected speed the voltage applied to the motor will be automatically varied by the reactor accordingly, to effect the necessary speed control. Automatic regulation within very close limits can thus be attained. Furthermore, since the power circuit includes no electronic tubes, the starting current and starting torque are not limited thereby. If reversal of the direction of rotation be desired together with speed control in the reverse direction it is necessary to duplicate certain of the components of the system and interconnect them through the necessary elements in common. The invention includes many modifications, some of which herein described provide intermediate types of control which are entirely satisfactory for certain applications.

The invention will be more readily understood by a consideration of the following description taken together with the accompanying drawings, wherein:

Fig. 5 is a circuit diagram, also for purposes of explanation, of an induction motor of which the speed is automatically maintained at a preselected value by means of a centrifugally operated switch which operates a control circuit based on that of Fig. 1;

Fig. 6 is the circuit diagram of a system which operates similarly to that of Fig. 5, but in which the centrifugal switch is replaced by electronic and other components in accordance with the invention, and in which the direct current which controls the operation of the system is derived as a function of the motor speed;

Fig. 6a is an alternative modification of Fig. 6 in which the tachometer is a direct-current machine;

The system of Fig. 7 is a refinement of that of Fig. 6 and is capable of closer regulation and control;

Fig. 8 is a circuit diagram of a preferred embodiment of the invention by which the speed and direction of rotation of an induction motor will be automatically maintained and may be accurately controlled by manipulation of a single control means; and Fig. 9 is the circuit diagram of a simplified system by which the speed and direction of rotation of an induction motor may be manually controlled, but without the automatic feature included in the system of Fig. 8.

A simple type of control system not including the invention will first be referred to so that the practical application of the more theoretical discussion which follows will be better understood.

Figure 1:
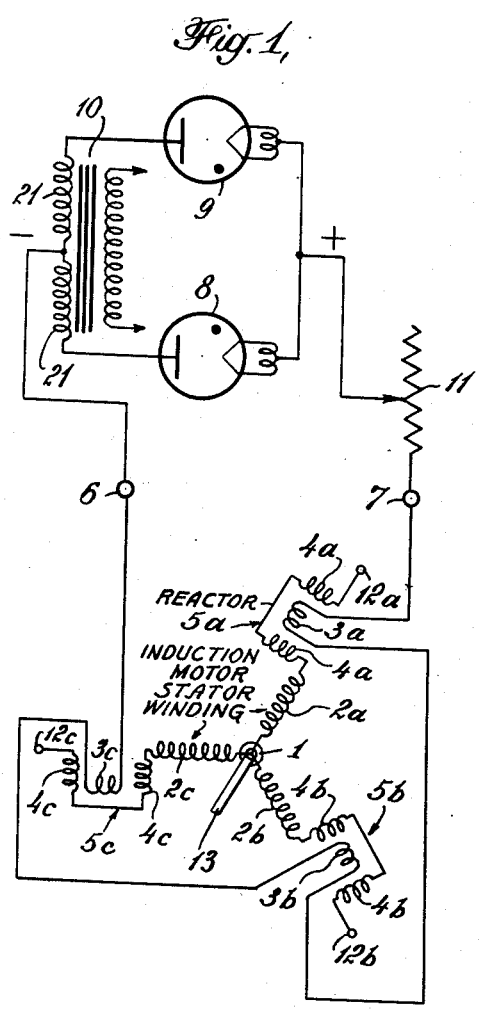
Fig. 1 is the circuit diaphragm of a simple form of control circuit employing saturable core reactors as applied to an induction motor included here for purposes of explanation.
Figure 1A:
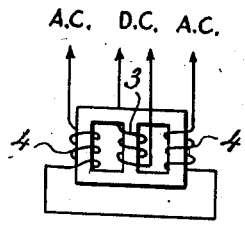
Fig. 1a shows the nature of one of the saturable core reactors illustrated in Fig. 1 and in many of the other figures.

Referring, therefore, to Fig. 1, the stator windings 2a, 2b and 2c of an induction motor are shown in the usual Y-connection. The rotor 1 is represented at the center. Between each of these stator windings and the power line terminals 12a, 12b and 12c a saturable core reactor 5a, 5b and 5c, respectively, in connected. Of course, only as many reactors as there are phases would be used. The nature of the reactors herein suggested as a suitable type is shown in more detail in Fig. 1a and is a device well known in the art. The reactors are similar and each includes a closed core with three legs. A coil 3 on the center leg of the core is designed for direct current. A winding 4, split into two sections and designed to carry the entire motor current for the phase with which that reactor is connected in series, is located on the two outer legs of the core. The two sections of winding 4 are so connected that there is no inductive effect between this winding and the direct current coil on the center leg of the core. The reactance of the winding 4 depends upon the effective magnetic permeability of the core which, in turn, depends upon the magnetic saturation of the core as determined by the amount of direct current which flows through the direct-current coil 3 on the center leg of the core. The result of this construction is that when no direct-current flows through coil 3 the reactor introduces maximum reactance in the circuit, whereas with sufficient direct current flowing in coil 3 this reactance is reduced to a minimum, so that by varying the value of direct current from zero to a suitable maximum value the reactance and hence the voltage drop across it may be varied over such a wide range that the motor speed may be continuously controlled from zero to full speed. In other words the effective voltage applied to the motor will be balanced regardless of the number of phases, and may be continuously controlled from substantially zero to full line voltage because the line voltage is reduced by the voltage drop in the reactor. The lower the voltage applied to the motor, the lower will be the motor speed, and conversely. Hence the motor speed is a function of and is approximately proportional to the value of direct current flowing through the direct current coils of the reactors. The invention is not limited to the type of reactor illustrated, because any other type of functionally equivalent reactor could be substituted.

In Fig. 1 a suitable source of direct current for controlling the reactance of the above described reactors is represented to comprise two gas-filled rectifier tubes 8 and 9 connected to a suitable power transformer 10 to provide full-wave rectification furnishing effectively direct current to the terminals 6 and 7, respectively, from a midtap on secondary 21 and a common connection to the cathodes of tubes 8 and 9. To vary the direct current, rheostat 11 is connected in series in the direct current circuit.

Those skilled in the art will recall that the control of the speed of an induction motor by variation of the applied voltage has heretofore been considered to be unsatisfactory and therefore not recommended. This finding has been based on the fact that attempts so to control the speed of induction motors has resulted in extremely poor speed regulation, low starting torque and considerable over-heating of the motor at low speeds. The reason for this poor performance of a standard induction motor with speed control by variation of the applied voltage, and the means whereby the motor characteristics can be improved and made entirely satisfactory, can perhaps best be illustrated by the curves of Figs. 2, 3 and 4 and the data in Tables I and II, below. In considering these figures and data it is well to keep in mind the fact that the torque of an induction motor is proportional to the magnetic flux multiplied by the rotor current which is in phase with the flux; that the flux is approximately proportional to the line voltage and that the slip is proportional to the ratio of the copper loss in the rotor to the total power received by the rotor from the stator. Likewise, "normal rated torque" is the torque which the motor will deliver continuously with the motor operating at rated voltage and rated speed with a maximum rise in temperature of any part not exceeding a predetermined amount, measured by thermometer, preferably 40 degrees centigrade. By the same token, "normal rated current" is the current which the motor draws when operated at normal rated torque, normal rated speed, and normal rated voltage.

Figure 2:
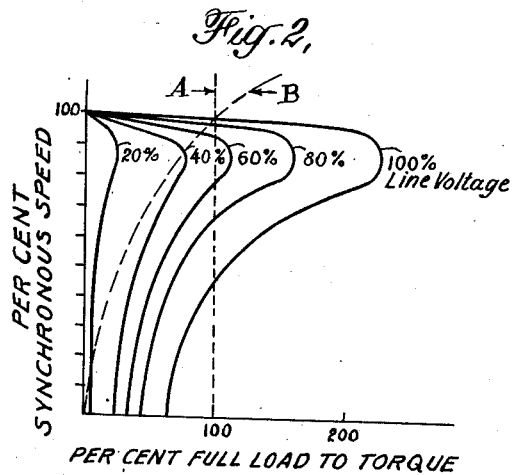
Figs. 2, 3 and 4 represent load curves and speed vs. torque curves of induction motors of different characteristics including those suitable for use with the control system of the invention.

The curves of Fig. 2 represent speed vs. torque characteristics of a motor of the squirrel cage type having a standard low resistance rotor, at five different fractions (in per-cent) of full line voltage. The dash curve marked (A) represents the torque required by a load which required a constant torque of 100 per-cent at all speeds. It is seen that the 100 per-cent line voltage curve cuts the load torque line at two points; that is, at two different speeds the torque developed by the motor is exactly equal to the torque required by the load. At the upper point of intersection the motor speed would be stable. If the motor speed increased slightly the torque developed by the motor would be less than the torque required by the load and the motor would be slowed down by the load. If the motor slowed down slightly below the point of intersection the torque developed by the motor would be slightly more than the torque required by the load and the motor would speed up. The motor would therefore tend to run at exactly the speed corresponding to the point of intersection and the speed would be stable.

At the lower point of intersection the reverse would be true, viz., the motor speed would be unstable. At a slight increase in speed above the lower point of intersection the torque developed by the motor would be greater than the load torque and the motor speed would increase on up to the speed corresponding to the upper point of intersection. At a slightly lower speed than that at the lower point of intersection the motor torque becomes less than the load torque and the motor would slow down to standstill. Therefore, it is evident that at the lower point of intersection the motor speed is unstable.

It is seen from Fig. 2 that at the upper or stable speed point the motor speed, with 100 per cent line voltage and a load of 100 per cent torque, is very nearly equal to 100 per cent or synchronous speed. It is also seen that, if the motor voltage is reduced to 80 per cent, there is only a very small reduction in speed. The point of intersection of the 80 per cent torque curve with the load line, A, is only slightly lower than the intersection with the 100 per cent voltage curve. Even a reduction to 60 per cent line voltage causes only a small reduction in speed. It is further seen that if the motor voltage is reduced much below 60 per cent the motor torque curve would fail entirely to cut the 100 per cent load curve, and under this load the motor would not continue to run at all but would slow down to standstill. Therefore, a motor of this standard induction type can be slowed down only a few per cent in speed, by a reduction of the motor voltage, before the motor will fail to carry the load entirely and slow down to standstill.

Figure 3:
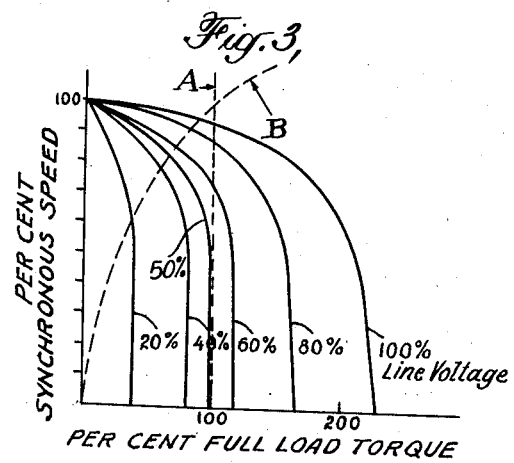

Somewhat better results can be obtained by increasing the rotor resistance so that the speed vs. torque curves will be as shown in Fig. 3. Here, a reduction of the motor voltage to about 50 per cent of the line voltage will cause a considerable reduction in motor speed but at this voltage the motor torque curve coincides with the load line, A, over the lower speed range, and the motor speed is therefore unstable over this portion of the range.

Figure 4:
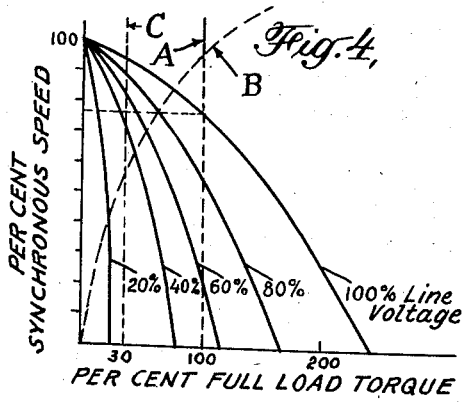

With a still further increase in rotor resistance motor speed vs. torque curves such as shown in Fig. 4 can be obtained. Here it is seen that the motor torque curves nowhere coincide with a motor load curve and cut the motor load curves at a substantial angle at all speeds from the maximum speed at 100 per cent voltage down to zero speed at about 50 per cent voltage. The speed of such a motor, driving a constant torque load, can, therefore, be adjusted to any value from a maximum speed down to zero speed by adjusting the motor voltage, and stable speed operation obtained at each speed setting.

Not only is it impractical to reduce the speed of a motor which has a low resistance rotor by a reduction in the motor voltage, because after a reduction of a few per cent in speed the motor speed suddenly drops to zero, but to obtain even a small reduction in speed the motor draws so much current that it overheats. This is illustrated by the data in Table I, which, like that of Table II, is given by way of illustration only, this data being a composite of a series of measurements and therefore differing slightly from the data on which the curves of Figs. 2, 3 and 4 were drawn:

*Table I*

| Flux, Percent | Rotor Resistance, Ohms | Rotor Current, Amperes | I²R Rotor Loss, Watts | Slip, Percent |
|---|---|---|---|---|
| 100 | .00044 | 300 | 40 | 4 |
| 50 | .00044 | 600 | 160 | 16 |
| 33.3 | .00044 | 900 | 360 | 36 |

It is assumed that the rotor has a resistance of .00044 ohm and that a rotor current of 300 amperes is required to develop 100 per cent torque with 100 per cent magnetic flux, that is, at 100 per cent voltage. It is further assumed that under this condition the rotor slip, that is, the drop in speed from synchronous speed, is 4 per cent. The rotor copper loss, that is, the rotor current squared times the rotor resistance, equals 40 watts. If now the magnetic flux is reduced to 50 per cent, then to produce the same torque the rotor current must be doubled, or increased to 600 amperes. Six hundred squared times .00044 equals 160 watts. As the slip is proportional to the rotor loss the slip is now only 16 per cent, but the rotor current has been doubled, i. e., is twice its normal rated value, and the motor would rapidly overheat. In other words, to increase the rotor loss, viz., rotor current, of a low resistance rotor sufficiently to reduce the motor speed appreciably requires such a large increase in the stator current to produce the required rotor loss that the motor, viz., both rotor and stator, overheats. As shown in Table I, a flux reduction to ⅓ of its normal value (even if the motor could be operated under such a condition) would require 3 times normal current or 9 times normal heating to produce even 36 per cent reduction in speed which would cause a very rapid overheating of the rotor.

If, however, the rotor resistance is increased to .01 ohm, for example, and the rating of the motor—that is, the load—reduced to ⅓ of its normal value, then the results will be as shown in Table II.

*Table II*

| Flux, Percent | Rotor Resistance, Ohms | Rotor Current, Amperes | I²R Rotor Loss, Watts | Slip, Percent |
|---|---|---|---|---|
| 100 | 0.01 | 100 | 100 | 10 |
| 50 | 0.01 | 200 | 400 | 40 |
| 33.3 | 0.01 | 300 | 900 | 90 |

Here it is seen that a reduction of the magnetic flux to ⅓ will produce a reduction in speed of 90 per cent, or reduce the motor speed to 10 per cent of synchronous speed, with a current of only 300 amperes, or its normal full load rating. If normal ventilation can be maintained at this reduced speed then the motor will not overheat. Such a constant torque load line is shown in Fig. 4 by dash line, C. As seen in the curve, the speed of the motor is stable at all speed settings, and the maximum speed of the motor at its ⅓ torque rating is up near the synchronous speed.

As shown in Tables I and II the necessary rotor loss to produce a required slip, that is, a desired reduction in speed, can be obtained with less current and therefore less heating of the stator winding as the rotor resistance is increased. It is also seen that as the slip is increased, and the motor speed reduced, the current required to produce a given torque increases. I have found that by increasing the rotor resistance sufficiently, a torque of the order of magnitude of ⅓ normal rated torque (i. e. about 30% to 50%) for a given motor size can be maintained at all speeds from maximum down to standstill without exceeding the normal rated current for the particular motor size. With such a combination of motor rating and rotor resistance it is possible to adjust the motor speed over the entire speed range, from a maximum speed of within about 10 per cent of synchronous speed down to standstill, simply by adjustment of the line voltage applied to the motor, and without exceeding the normal rated current for the motor at any speed setting even when driving a constant torque load.

The value of resistance for the rotor which will provide the last above-described operation in accordance with this invention, may conveniently be determined experimentally by first selecting, for example, an induction motor of the squirrel cage type having a standard rotor, which will be of low resistance. Such standard motor will have known rated full load torque and full load current. A suitable ammeter is connected in series with the stator winding and suitable means for decreasing the line voltage should be provided. The rotor is then removed from the motor, placed in a lathe, and the end rings of the squirrel cage turned down slightly in order to increase the effective resistance. After re-assembling the motor, a load is applied to the motor which is approximately one-third (say 30% to 50%) of the full rated torque of the motor, and the line voltage is decreased until the motor slows to a standstill or to the desired minimum speed, while the ammeter reading is observed. Finally, that value of motor resistance is selected at which just at standstill, or at the selected minimum speed, the motor current does not exceed a safe value. A safe value is that current in excess of which overheating results. If when this is done the maximum speed is too low, then a motor of larger size should be selected and the foregoing procedure repeated.

By way of example, it may be stated that by following the above mentioned procedure, a rotor resistance of between approximately 5 to 18 times that of a standard induction motor having between 3% and 4% slip, has been found to be satisfactory in providing speed control according to the invention. Those skilled in the art will appreciate that the rotor resistance here provided is of a different order of magnitude from that heretofore employed in induction motors. The range of resistance above mentioned is, from a practical point of view, not as great as at first appears, because it includes both slip ring and squirrel cage types, the resistance of the former being normally about twice that of the latter. In other words, an average value of motor resistance for a slip ring motor according to the invention might be, say, 7 times the normal resistance heretofore employed; whereas for a squirrel cage motor it might be, say, 14 times, at a load or torque of, say, ⅓ normal.

Load curves B in Figs. 2, 3 and 4 follow a square law, typical of loads such as fans and centrifugal pumps. These load curves cut the motor torque curves at much wider angles than the constant torque load lines A and C, and intersect the motor torque lines at only one point and on the stable part of the torque curves. In other words, this type of load characteristic curve nowhere coincides with the motor speed vs. torque curve, and intersects it at one point only. Stable operation with such loads can, therefore, be obtained at all speeds, with motor voltage control, with little if any increase in rotor resistance. Also, because of the low torque required at the lower speeds, little decrease in motor rating is required to keep the motor from overheating.

The speed regulation of a motor with a high resistance rotor would ordinarily be very poor with change in load, namely, at any given setting a change in load would cause a wide change in speed. By the present invention, including an automatic control system, this difficulty is obviated, with the result that the motor speed can be held practically constant at each speed setting, independently of the load.

A simple form of the invention providing automatic speed control is illustrated in Fig. 5. The control system here illustrated will automatically control the speed of an induction motor at any desired value within limits of operation later referred to. The motor stator windings $2a$, $2b$, $2c$ are, as in Fig. 1, connected in series with the A. C. windings of similar reactors $5a$, $5b$, $5c$, respectively. As before, the power line terminals are represented at $12a$, $12b$, and $12c$, respectively. The rotor $1$ of the motor is not shown in detail, but may be assumed to be of the slip ring or squirrel cage type and of sufficiently high resistance for use with the present control system, as explained in connection with Figs. 2, 3 and 4. The shaft of the motor is represented by a dash line $13$ to which is mechanically coupled a centrifugal governor switch which may be of any suitable type well known in the art. Such switches have heretofore been employed to effect a change in resistance of the rotor at a certain speed, or to effect other suitable circuit connections to provide sufficient torque at starting and then to operate automatically at a predetermined speed to effect full-speed connections. A switch of this type may be adjusted to operate at any desired speed within quite a wide range, and is here utilized to maintain the motor at the speed for which the switch has been pre-set, and to maintain that speed for all loads at which the motor is capable of operating.

Connected in series with the switch $16$ are a resistor $18$ and the secondary $20$ of a power transformer $19$. A condenser $17$ is connected across switch $16$. Between the center tap of transformer winding $20$ and one terminal of condenser $17$ is connected the primary of a coupling transformer $14$, as shown. The secondary winding $15$ of this transformer is connected in the control circuit of a full wave grid-controlled gas-filled tube, or Thyratron, rectifier which comprises rectifier tubes $81$ and $91$, the respective grids $42$ and $43$ of which are connected to the two terminals of winding $15$. The center tap of winding $15$ is connected to the cathodes $44$ and $45$ of tubes $81$ and $91$ in parallel.

The output circuit of this rectifier includes a power transformer $10$ having a secondary winding 21, the two terminals of which are connected respectively to the two plates 46 and 47 of tubes 81, 91, as is the practice in the art. The direct current coils 3a, 3b and 3c of the reactors 5a, 5b and 5c, respectively, are connected in series between the center tap of secondary winding 21 and the cathodes 44 and 45. Thus, alternating current power applied to primary winding 48 of transformer 19 is rectified by the rectifier 81, 91 and the resulting direct or unidirectional current flows through direct current coils 3a, 3b and 3c. The value of this direct current, viz., whether it be a maximum or a minimum, is automatically controlled in accordance with the motor speed, and thus controls the motor speed, as follows: When the switch 16 is closed the resistance 18 is connected across the secondary 20 of transformer 19. Under these conditions the alternating current (A. C.) voltage applied to the grids 42 and 43 of tubes 81, 91, is in phase with the voltage applied to the plates 46, 47 of these tubes through transformer 19, and a maximum value of direct current flows between terminals 6 and 7 of the D. C. control circuit. This reduces the reactance of the reactors 5a, 5b and 5c to a minimum, resulting in maximum line voltage applied to stator windings 2a, 2b and 2c which tends to increase the speed of the motor to its maximum. When the speed of the motor increases the centrifugal governor switch 16 opens which connects condenser 17 and resistance 18 in series across transformer winding 20. This shifts the phase of the voltage on the grids 42, 43 with respect to the voltage on the plates 46 and 47 substantially 180°, which effectively opens the plate circuits of tubes 81 and 91 so that substantially no direct current flows through terminals 6 and 7 or through coils 3a, 3b and 3c. The resulting decrease in the D. C. fields of these last-mentioned D. C. coils increases the reactance of the reactors to a maximum, reducing the applied line voltage to the stator windings 2a, 2b and 2c and slowing down the motor. When the motor slows down to a predetermined speed for which the switch 16 is adjusted it closes again and the above-described operation is automatically repeated.

The foregoing control operation obviously causes a slight speed fluctuation of the motor the magnitude of which depends largely upon the design of the governor. However, there are available switches sufficiently sensitive to change in speed that the resulting fluctuation in speed is not detrimental for many purposes. The practical result of such a system is to give to an induction motor having otherwise poor regulation the desirable characteristics of a shunt wound direct-current motor.

To assist those skilled in the art to carry out this invention it is suggested, purely by way of example, that resistor 18 may have a value of 190 ohms and that condenser 17 be of approximately 2 microfarads, if a 60 cycle power source is employed. Transformers 19 and 14 may be such as to furnish to each of the grids 42 and 43 a potential of about 5 volts. It should be pointed out in connection with the system of Fig. 5 as with all the other control systems herein described, that the power furnished to and handled by the control system per se is comparatively small and, in general, may be the same regardless of the load on the motor because the motor windings are independently connected to the line terminals 12a, 12b and 12c. Thus the motor current does not pass through any electronic tubes, switches, or movable elements, but only through reactors 5a, 5b and 5c which should be of a rating suitable to handle the motor current.

The control system of Fig. 6 is, like that of Fig. 5, an "off and on" control, but includes certain advantages and refinements which will be described below. The advantage which is first apparent is that the centrifugal governor switch of Fig. 5 is replaced by an electronic system which operates in response to variation in voltage generated by a small pilot alternator preferably of simple and reliable type. The frame and shaft of this alternator may be fastened directly to the motor frame and shaft, respectively.

The alternator referred to, which is shown at the left of the diagram comprising Fig. 6 is designated by the reference character 48, and as shown is mechanically coupled to the motor shaft 13. A direct-current generator could be substituted for this alternator together with the rectifier connected to its output as shown in Fig. 6a, but it has been found in practice that an alternator is more reliable because it may be of the inductor type which eliminates commutators, brushes and slip rings, together with their inherent disadvantages. However, the D. C. machine inherently has the advantage of being polarity sensitive, viz., the polarity of its output voltage changes with direction of rotation, which is not true of the alternator. Such alternator may be of the single phase inductor type provided with enough poles to generate a useful frequency at low speeds. A design found to be suitable for this purpose generates a 210 cycle voltage at 1800 R. P. M., although other suitable designs could be employed.

The output terminals 49, 50 of alternator 48 are connected to the two plates of a rectifier tube 22. This tube might be of the type 6X5, for example, which is of the indirectly heated cathode type. This tube, having two plates and thus providing full-wave rectification, requires a center tap or neutral point of connection to the A. C. power supply. Here such a point is represented by center tap 29 on the winding of the alternator. It could as well be the center tap of a resistor or of an inductance or transformer winding effectively connected across the output terminals. (The latter scheme is employed in the system of Fig. 8.) Between center tap 29 and the cathode 51 of the rectifier are connected a condenser $C_1$ and resistor $R_1$ in parallel. By way of example, condenser $C_1$ might have a value of 1 microfarad and resistor $R_1$ a value of 100,000 ohms. Thus there is developed across resistor $R_1$ a D. C. potential (positive at the top of the resistor and negative at the bottom, as seen in the drawing) which varies substantially in proportion to the speed of shaft 13. An amplifier tube 23, preferably of the high mu type such as type 6F5, is controlled by the fluctuation of potential developed across resistor $R_1$. For this purpose the grid of tube 23 is connected to the positive terminal of resistor $R_1$, the negative terminal of which is connected to the cathode 53 of tube 23 through a potentiometer $R_5$ which is connected in shunt to a part of resistor $R_4$. The output or plate circuit of tube 23 includes resistor $R_2$ and a portion of resistor $R_4$, as shown. Resistor $R_2$ is a coupling resistor whereas resistor $R_4$ is a voltage divider, suitable direct-current potential for which is derived from rectifier 25, power transformer 26 having a center-tapped secondary 27, and filter condenser $C_2$. Such a source of direct current potential is common in the art. Thus from voltage divider $R_4$ are derived the necessary operating potentials for the plate and grid electrodes of tube 23. Obviously any other suitable potential source could be substituted.

A second amplifier tube 24 is coupled to the output of tube 23. Tube 24 may preferably be of a type having a fairly high plate current such as type 2A3. Connected in the plate circuit of tube 24 is a suitable power limiting resistor $R_6$ and a coupling resistor $R_3$ which, for example, may be of 5,000 ohms. A battery $B_1$ (which may be any other suitable source of D. C. potential) is connected with its positive terminal to the lower terminal or resistor $R_3$ and its negative terminal to the cathode 56 of tube 24. To the output circuit of tube 24 is coupled a Thyratron rectifier similar to that shown in Fig. 5 where, as in the other figures, like components are designated by like reference characters. However, in the system of Fig. 6 the Thyratron tubes 81 and 91 are controlled by biasing the grids 42, 43 thereof with a direct current potential instead of an alternating potential as in Fig. 5. Hence a battery or other suitable source of direct current $B_2$ is connected with its negative terminal to resistor $R_3$ and its positive terminal to the cathodes 44 and 45 of tubes 81 and 91, respectively. To complete this circuit the grids 42 and 43 are connected to the positive terminal of resistor $R_3$.

The operation of the system of Fig. 6 is as follows: With the motor stopped and no potential developed across resistor $R_1$, as resulting from the generation of a potential by alternator 40, the tube 23 may be assumed to be biased negatively by reason of the adjustment of slider 30 on speed control potentiometer $R_5$ toward the negative end thereof. Under these conditions no plate current flows through resistor $R_2$ and hence there is zero grid bias on the grid of tube 24 which makes that tube conductive, viz., current flows through the plate circuit and hence through resistor $R_3$. Current flowing through resistor $R_3$ develops a positive potential at terminal 52 which in turn is connected to the grids 42 and 43 of Thyratron tubes 81 and 91, respectively. A positive bias on grids 42 and 43 causes these tubes to conduct which, in turn, as explained in connection with the system of Fig. 5, decreases equally the reactances of the reactors assumed to be connected to terminals 6 and 7, as in Fig. 5, and the motor starts. As the motor increases in speed, a voltage is developed across terminals 49 and 50 of alternator 40, which develops a potential across resistor $R_1$ biasing tube 23 positive, causing current to flow through $R_2$ which biases the grid of tube 24 negative. This cuts off the current through resistor $R_3$, permitting the bias battery $B_2$ to bias grids 42 and 43 strongly negative, shutting off the direct current to terminals 6 and 7. As before, the result of cutting off the direct current in the reactor coils decreases the motor speed. From the foregoing it will be observed that the motor speed will thus be maintained effectively at a rate determined by the position of adjustable contact 30 on potentiometer $R_5$. Hence by means of the system of the invention illustrated in Fig. 6, the motor may be started, stopped and its speed changed during operation by control of a single adjustable element and the selected speed will be automatically maintained substantially at the predetermined rate.

In the control system of Fig. 7 the generator 40 and rectifier 22 are represented as in Fig. 6. Also as in Fig. 6 the input circuit of vacuum tube 23 includes resistor $R_1$ across which is developed a direct current voltage substantially proportional to the speed of generator 40 which, as before, is driven directly by the motor of which the speed is to be controlled. The A. C. generator and rectifier may be replaced, as shown in Fig. 6a, by a D. C. generator the output voltage of which is impressed across resistor $R_1$. The voltage across resistor $R_1$ may for convenience be called the control voltage or the speed voltage. By way of example, the resistance of resistor $R_1$ may be approximately 100,000 ohms and the capacity of condenser $C_1$ connected across it may be approximately 1 microfarad. In any event, the values of these two components should preferably be proportioned to provide the required stability, viz., freedom from hunting of the motor being controlled. The full wave rectifier tube 25 furnishes plate voltage to tube 23 through coupler resistor $R_2$ which may, for example be of ½ megohm and also furnishes a direct current voltage across resistor $R_4$ which functions as a voltage divider. A part of resistor $R_4$ is connected in the plate circuit of tube 23 in series with resistor $R_2$ as in the case of Fig. 6. By connecting the cathode 53 to the point 0 on resistor $R_4$ the portion of resistor $R_4$ to the left of 0 will provide a negative bias to the grid of tube 23 when contactor or slider 30 makes connection with such portion, as is shown in the drawing, because the two voltages are effectively in series. On the other hand when slider 30 is moved to the right of point 0, a positive bias of variable magnitude will be impressed on the grid. Hence, as the voltage developed across $R_1$ impresses a negative bias on the grid 54 of tube 23 substantially proportional to the speed of generator 40, and the reference voltage derived from the position of slider 30 may be varied from a negative value which will aid the voltage across $R_1$ to any desired positive value which will "buck" the voltage across $R_1$, the current flowing in the plate circuit of tube 23 at any given speed of the generator 40 may be predetermined by adjustment of slider 30. From this it will be seen that the effective bias voltage impressed on grid 54 comprises the algebraic sum of the control voltage across resistor $R_1$ and the reference voltage across that portion of resistor $R_4$ between the point 0 and the slider 30. Thus, this resultant voltage applied as a bias to tube 23 may be either positive or negative depending upon the relative magnitudes of the component voltages. The position of the point 0 on resistor $R_4$ will in any specific case obviously be determined by the characteristics of the tube 23, and by the type and degree of control desired.

The input circuit of vacuum tube 24, which, for example, may be similar to tube 24 of Fig. 6, is coupled to the plate circuit of tube 23, but the connections are reversed in respect to customary procedure, and in respect to the arrangement of Fig. 6. It will be noted that the cathode 56 of tube 24 is connected to the plate 57 of tube 23 and to the negative end of resistor $R_2$, whereas in Fig. 6 the cathode 56 of tube 24 is connected to the positive terminal of resistor $R_2$. Likewise, in Fig. 7, the grid 58 of tube 24 is connected to a point 55 on resistor $R_4$ which is somewhat more negative than the positive terminal of resistor $R_2$ instead of being connected to the negative end of resistor $R_2$ as in Fig. 6. The purpose of this reversal in coupling connections is explained below in connection with the operation of this system.

The plate circuit of vacuum tube 24 includes a coil 35 comprising the direct-current control coil of a saturable core reactor 33 which may obviously be smaller than those in the motor power circuit. In this arragement a third fullwave rectifier tube 31 fed by a power transformer 32 is connected to the plate circuit, of tube 24 and thus replaces the equivalent battery B₁ of Fig. 6. The alternating-current winding 34 of reactor 33 is connected in a series circuit comprising also resistor 37 and the secondary winding 59 of a transformer 36. The primary winding 60 of transformer 36 is assumed to be connected, as are the other primary windings of transformers 26, 32 and 10 to a suitable alternating power source, say of 60 cycles. In this connection it may be mentioned that transformers 10 and 36 should be connected to the same power source. The primary winding 39 of transformer 38 is connected between the center tap of secondary 59 and a point 61 in the series circuit between coil 34 and resistor 37. The rectifier comprising Thyratron tubes 81, 91 is a full wave rectifier, the plates 46, 47 of these tubes being connected to the two terminals of the secondary 21 of transformer 10, and the grids 42, 43 being connected to the two terminals of the secondary winding 62 of the transformer 38. Cathodes 44 and 45 of tubes 81, 91 are connected together and to the center tap of secondary winding 62. Thus the center tap of winding 21 comprises a negative terminal, and the center tap of winding 62 comprises a positive terminal, and to these, through terminals 6 and 7 are connected the direct current control coils of the saturable core reactors as in the preceding figures.

The operation of the control system of Fig. 7 is an follows: Assuming that the motor is stopped, and hence generator 40 is not generating, the motor may be started by sliding control 30 to the right of point 0 on resistor R₄. This will bias grid 54 of tube 23 positive causing plate current to flow through resistor R₂ which in turn will bias the grid 58 of tube 24 positive with respect to cathode 56, causing plate current to flow through direct-current control coil 35. The reactance of reactor 33 is thus reduced to a value effectively less than the resistance of resistor 37 which in turn causes the A. C. voltage applied to grids 42 and 43 of Thyratron tubes 81, 91, respectively, to be substantially in phase with the A. C. voltage impressed on plates 46 and 47 of those tubes, with the result that a fairly large direct current flows through terminals 6 and 7, and through the direct current control coils 3a, 3b and 3c of the motor control reactors 5a, 5b and 5c. As previously indicated in connection with Fig. 1, this reduces the effective reactance of these reactors equally and permits a balanced starting current to flow through the motor. The result of this application of a balanced voltage to the stator windings of the motor is to produce a single revolving magnetic field which rotates in one direction only.

When the motor has reached, and, for example, just exceeded a speed which corresponds to the setting of slider 30 on resistor R₄, the positive bias theretofore impressed on grid 54 of tube 23 will be opposed and slightly exceeded by the voltage drop across resistor R₁, causing tube 23 to be biased slightly negative. This reduces the current in resistor R₂ and correspondingly decreases the positive bias on grid 58 of tube 24, or causes the bias on that grid to become more negative depending upon the degree of change, thus decreasing the current in control coil 35 of reactor 33. This increases the effective reactance of reactor 33 so as to be, say, slightly higher in its effect than the resistance of resistor 37. The phase of the grids 42, 43 with respect to the plates 46, 47 of tubes 81, 91, respectively, will thereby be shifted in an out-of-phase direction a corresponding degree, with the result that the current through terminals 6 and 7 will be decreased and the motor speed correspondingly decreased until the entire system is in balance.

A control system as shown in Fig. 7 is quite sensitive to changes of motor speed and will, therefore, maintain the motor speed at a quite constant value with completely smooth operation. However, should the automatic regulation of speed be inadequate in any given instance, closer regulation can be attained by substituting an additional stage or stages of amplification for the single amplifier stage comprising tube 23 and its associated circuits.

From the foregoing it will be understood that the speed at which the system of Fig. 7 maintains the motor is determined by the relation of the potential drop across resistor R₁ to the potential drop across that portion of resistor R₄ between point 0 and the position of adjustable contact or slider 30 (assuming that slider 30 is to the right of point 0). When slider 30 is in the mentioned position and it is desired to stop the motor, it may be necessary to move the slider to the left of point 0 on resistor R₄. In any event by so doing the grid of tube 23 will be biased well beyond cut-off with the result that the power to the motor will be immediately decreased substantially to zero, thus quickly stopping the motor. By reversing the coupling between tubes 23 and 24, as above mentioned, at least one advantage is introduced over the operation of Fig. 6, viz., if for any reason the plate current of tube 23 is interrupted, as by failure of the tube, the motor will stop, whereas in the arrangement of Fig. 6 the motor will run at full speed.

The control system illustrated in Fig. 8 provides not only complete control of the speed of an induction motor and automatic maintenance thereof at any preselected value, as in the system of Fig. 7, but also permits reversal of the motor and similar speed control in the reverse direction. Although any convenient form of control device could as well be provided, the one illustrated in Fig. 8 of the rotary rheostat type actuated by a single knob has been found satisfactory. At a zero or balance point intermediate the two extremes of rotation of this knob the motor will be at a standstill, and as the knob is rotated in one direction the motor will start and gain speed until maximum speed is reached at the extreme position of the knob in the direction in which it was first moved. As the knob is rotated back toward the zero position the motor will slow down to a stop, and then if the knob is rotated in the same reverse direction away from the zero position the motor will start in the reverse direction and gain speed until full speed is reached at the extreme position of the knob in the latter direction.

The system of Fig. 8 comprises essentially two control channels each being similar to the system of Fig. 7. These two channels are connected together in such manner as to cooperate to provide additional advantages, including: (1) the control of the motor speed and direction of rotation by a single remote control means, (2) the connection of two sets of variable reactors between the motor and the line in reverse order so as to effect control of direction as well as speed of the motor, and (3) an arrangement whereby at the "zero" position of the control at which the two control channels are effectively in balance in respect to the motor, the motor will stop without opening the line to the motor, because, as explained at the outset, this invention permits complete control of the motor without employing contacts or movable elements in the motor power circuit. It will be evident that although control of the speed and direction of rotation by a single control as here shown may be preferred, the invention is not limited to such unicontrol.

The control channel at the upper part of Fig. 8 is represented in a manner generally similar to that of Fig. 7, corresponding components being designated by corresponding reference characters. The control channel at the bottom of Fig. 8 will be seen to be similar to that of the upper channel, and circuit elements or components which correspond thereto are designated by the same reference characters plus 100. Therefore, the operation of each of the two channels individually is the same as that described in connection with Fig. 7, although as here combined, the two channels provide a system having additional features of operation. Both channels function at all times, but in a different manner except when the motor is held at standstill, that is, while one channel maintains the magnitude of A. C. current through one set of A. C. windings at substantially zero, the other channel maintains the A. C. current through the other set of A. C. windings at the magnitude required to operate the motor at the preselected speed in the preselected direction.

Referring to Fig. 8, a generator 40 is mechanically coupled to motor shaft 13 and the output of this generator is electrically coupled to two rectifier tubes 22 and 122 through transformers 41 and 141, respectively. The center taps 29a and 129a on the secondary windings of these two transformers correspond functionally to the center tap 29 on the generator winding of Fig. 7. To control the direction of rotation and speed of the motor a single control knob 92 is provided which functions as a unitary control for sliders 30 and 130 on resistors $R_4$ and $R_{104}$, respectively. It will be noted that the terminals of these two resistors are connected respectively to the positive and negative terminals of the same direct-current voltage supply comprising rectifier 25 and its associated components. A separate voltage supply could be connected to each resistor, but it is preferable to employ a single supply, because it would be difficult to maintain two voltage sources at exact equality.

To control the alternating-current power to the motor, two reactors of the saturable core type are shown connected in series with each phase of the motor and the line. In order to effect reversal of the direction of rotation of the motor the A. C. windings of one set of reactors are connected in the reverse order with respect to the other set. This relative order of connection can conveniently be seen at the power line terminals which are designated 12cb, 12bc and 12aa to indicate the order of connection of the reactor windings. In a three-phase system, as here illustrated by way of example, two of the phases are connected to the line in reverse order with respect to each other, but the third phase connection, 12aa, is necessarily the same. In a two-phase system this phase would be omitted.

The operation of the control system of Fig. 8, in some respects is similar to that of Fig. 7, but differs in other respects. When the sliders 30 and 130 are in the position shown in the drawing the grids 54 and 154 of tubes 23 and 123 are equally biased slightly negative, i. e., are biased sufficiently to cut off the currents in the plate circuits. When knob 92 is rotated so that, for example, slider 30 is in contact with tap 0, the grid 54 or tube 23 is at the same potential as the cathode 53 thereof, and plate current will begin to flow through that tube and through resistor $R_2$. At this adjustment of sliders 30 and 130, tube 123 will be biased beyond cut-off. The effective reactance of reactors 5a, 5b and 5c will then be less than that of reactors 105a, 105b and 105c, causing the motor to rotate in the corresponding direction. As a practical matter, the current through the second set of reactors 105a, 105b and 105c will then be substantially zero and will remain so at all settings of slider 30 between point 0 and the positive terminal of resistor $R_4$— which corresponds to the entire speed range of the motor in that direction. Similarly, when slider 130 is connected to tap point 100 the motor will start (or tend to start, depending upon the load) in the reverse direction, because the effective reactance of the second set of reactors 105a, 105b and 105c will be less than that of the first set 5a, 5b and 5c, and in fact, while the slider 130 is anywhere between point 100 and the positive terminal of resistor $R_{104}$, the upper channel will be biased beyond cut-off so as to substantially prevent current flowing to the motor windings through reactors 5a, 5b and 5c while the speed is under the control of reactors 105a, 105b and 105c. Thus the effective reactance of one set of reactors is maintained at substantially maximum while the effective reactance of the other set of reactors is being varied to obtain speed control.

It may be noted that there are two alternating-current reactor windings connected in series between each to phases of the line. However, the reactors are so constructed and connected together that the effective reactance of this interphase connection is so high that no appreciable short-circuit current flows. The only condition under which there would tend to be a short-circuit would be in the event that the reactance of both sets of reactors were simultaneously reduced by the direct-current control circuits. However, in the described system of this invention there is no possible setting of the controls by which this could occur. As in Fig. 7, the arrangement of Fig. 8 is not limited to the type of reactors illustrated, for other equivalent types could be employed.

Referring finally to Fig. 9, there is illustrated a simplified control system by which the speed and direction of rotation of an induction motor may be manually controlled, but without the automatic feature included in the system of Fig. 8. The general arrangement of the system of Fig. 9 corresponds to that of Fig. 1 in much the same manner that the system of Fig. 8 corresponds to that of Fig. 7. It is intended that the control system to the left of terminals 6, 7, 106 and 107 of Fig. 8 be replaced by that to the left of the same terminals in Fig. 9. This system comprises a double rheostat operated by a unicontrol knob 92 and including resistors 11 and 111 which correspond functionally to resistors $R_4$ and $R_{104}$ of Fig. 8. The two resistors 11 and 111 are connected to terminal 61 of any suitable direct-current source. The two terminals 7 and 107 are connected to the other terminal 161 of the direct-current source. The sliders 30 and 130 of the rheostat are connected respectively to the two terminals 6 and 106.

It will be recalled in connection with the description of the system of Fig. 8 that to achieve satisfactory operation it is desirable that one set of motor control reactors be maintained at maximum effective reactance while the effective reactance of the other set of reactors is being varied to obtain speed control. This result is effected in the arrangement of Fig. 9 by providing two conductive or very low resistance segments or sectors 62 and 162 on which sliders 30 and 130, respectively, ride. These sectors are connected to the resistors 11 and 111 which are connected to the terminal 61 and thus provide a uniform maximum reactance in one set of reactors while the reactance of the outer set is being varied to control the speed in the chosen direction of rotation of the motor. Differently stated, the speed of the motor is increased by decreasing the resistance in series with one set of D. C. coils and increasing the current in this set of coils whilst automatically holding at a minimum value, or decreasing, the current in the other set of D. C. coils. It is evident that other equivalent types of voltage control means could be substituted for the double rheostat of rotary type here described by way of example.

What is claimed is:

1. In a system for controlling the speed and direction of rotation of a multiphase A. C. induction motor having a winding for each phase, a first set of saturable core reactors each having an A. C. winding and a D. C. coil associated therewith, the A. C. winding of each reactor being connected between one phase of the line and one of said motor windings, respectively, at least one D. C. source, and a variable resistor, first circuit means connecting the D. C. coils of said reactors in series with said D. C. source and said resistor, a second set of saturable core reactors similar to those of said first set, the A. C. winding of each of said second set of reactors being also connected between one phase of the line and one of said motor windings, respectively, the A. C. windings of said second set being connected to said phases in reverse order with respect to those of said first set, a second variable resistor, second circuit means connecting the D. C. coils of said second set of reactors in series with said D. C. source and said second resistor, and unicontrol means for simultaneously varying said resistors so as to increase the current in the first set of D. C. coils whilst automatically decreasing the current in the second set of D. C. coils, and vice-versa.

2. A system according to claim 1, in which said unicontrol means includes means for simultaneously varying said resistors so as to vary the current in the first set of D. C. coils whilst automatically maintaining the current in the second set of D. C. coils below a substantially fixed predetermined value, and vice-versa.

3. In a system for controlling the speed and direction of rotation of a multiphase A. C. induction motor having a winding for each phase, a first set of saturable core reactors each having an A. C. winding and a D. C. coil associated therewith, the A. C. winding of each reactor being connected between one phase of the line and one of said motor windings, respectively, a second set of saturable core reactors similar to those of said first set each having an A. C. winding and a D. C. coil associated therewith, the A. C. winding of each of said second set of reactors being also connected between one phase of the line and one of said motor windings, respectively, the A. C. windings of said second set being connected to said phases in reverse order with respect to those of said first set, D. C. source means for energizing said D. C. coils, first and second variable resistors, and circuit means interconnecting said D. C. coils, said source means and the respective resistors such that adjustment of said resistors varies the D. C. current in said sets of coils selectively, and unicontrol means for simultaneously adjusting said resistors so as to vary the current in the first set of D. C. coils whilst automatically maintaining the current in the second set of D. C. coils below a predetermined fixed value, and vice-versa.

4. A circuit for controlling the direction and speed of rotation of a multi-phase induction motor, comprising a multi-phase power circuit for the motor, a plurality of saturable core reactors arranged in two sets each having an alternating-current winding for each phase of the power circuit, direct-current windings electromagnetically associated with said alternating-current windings, the alternating-current windings being connected one in each line wire of the power circuit in series with the motor with the alternating-current windings of one set of reactors connected to produce a different phase sequence from the windings of the other set of reactors, the alternating-current windings normally having such a high impedance as to prevent any material application of voltage to the motor, and control circuit means operable selectively and variably to energize the direct-current windings to govern the direction and speed of rotation of the motor by control of the magnitude and phase sequence of the voltage applied to the motor, said means including means for producing a voltage corresponding to the desired speed of the motor, and means for stabilizing operation of the motor at the speed desired.

5. In a system for controlling the speed and direction of rotation of a multi-phase A. C. induction motor having a winding for each phase, a first set of saturable core reactors, each reactor having an A. C. winding and a D. C. coil, the A. C. winding of each reactor being connected between one phase of the line and one of said motor windings, respectively, D. C. source means connectible to said coils, a first D. C. control device coupled to said D. C. source means and adjustable in a first direction to increase the current through the first set of D. C. coils, a second set of saturable core reactors similar to those of said first set, the A. C. winding of each of said second set of reactors being also connected between one phase of the line and one of said motor windings, respectively, said second set of A. C. windings being connected to said phases in reverse order with respect to those of said first set, a second D. C. control device coupled to said D. C. source means and adjustable simultaneously with adjustment of said first device in said first direction to decrease the current through the second set of D. C. coils, each of said D. C. control devices being provided with means which maintains the current through one set of said D. C. coils substantially constant at a minimum value whilst the current through the other set of said D. C. coils is adjusted over a speed-control range, and unicontrol means for simultaneously adjusting said D. C. control devices corresponding to motor rotation in either direction.

6. In a system for controlling the speed and direction of rotation of a multi-phase A. C. induction motor having a winding for each phase, a first set of saturable core reactors, each reactor having an A. C. winding and a D. C. coil, the A. C. winding of each reactor being connected between one phase of the line and one of said motor windings, respectively, D. C. source means, a first D. C. control device coupled to said D. C. source means and adjustable in a first direction to increase the current through the first set of D. C. coils, a second set of saturable core reactors similar to those of said first set, the A. C. windings of each of said second set of reactors being also connected between one phase of the line and one of said motor windings, respectively, said second set of A. C. windings being connected to said phases in reverse order with respect to those of said first set, a second D. C. control device coupled to said D. C. source means and adjustable in said first direction to decrease the current through the second set of D. C. coils, each of said D. C. control devices comprising a similar rheostat having a high resistance element and a low resistance element connected in series, two adjustable contact members one for each of said series-connected elements, a plurality of coupling means connected respectively to each of said contact members and to terminals on said resistance elements and operative to connect the D. C. coils of each set respectively to said D. C. source means, and uni-control means coupling both of said contact members so that only one of said members is in contact with a low-resistance element at a time, whereby the D. C. current in the first set of D. C. coils is maintained substantially constant at a minimum value whilst the D. C. current in the second set of D. C. coils is varied over a speed-control range from or to a minimum value, and vice versa.

7. In a system according to claim 3 wherein said D. C. source means includes a source of D. C. voltage the magnitude of which is automatically proportional substantially to the speed of said motor, electronic coupling means connected between each said variable resistor and the set of D. C. coils with which it is associated, and connections from said resistors to said electronic coupling means operative to maintain a substantially minimum value of D. C. current in one set of D. C. coils whilst the D. C. current in the other set of D. C. coils is varied over a range between a minimum and a greater value.

8. A system according to claim 3, wherein said D. C. source means includes a source of D. C. voltage the magnitude of which is automatically proportional substantially to the speed of said motor, a coupling system for coupling each said resistor to the set of D. C. coils with which it is associated, said resistors being arranged so that said unicontrol means is adjustable to a position at which said sets of reactors are balanced to stop rotation of said motor, and connections in said coupling systems providing an adjustable speed range for said motor in either direction of rotation when said unicontrol means is moved in either direction respectively, from said balanced position.

9. In a system for controlling the speed of an A. C. induction motor operable from an A. C. source, means for generating a D. C. control voltage which is substantially proportional to the speed of said motor, means responsive to variation in D. C. voltage for controlling the A. C. voltage applied from said source to said motor, and a coupling system connected between said D. C. voltage generating means and said responsive means including, a first vacuum tube amplifier having grid and plate circuits, an adjustable biasing voltage effectively connected in series with said control voltage, the resultant of said two voltages being effective to bias said grid circuit, a second vacuum tube amplifier having grid and plate circuits, said first plate circuit being coupled to said second grid circuit, a saturable core reactor having a D. C. coil and an A. C. winding, said D. C. coil being connected in the plate circuit of said second amplifier tube, a first A. C. transformer having a primary winding connected to said A. C. source and a secondary winding which is connected in a series circuit including said A. C. winding and a resistor, a second A. C. transformer having a primary and a secondary, said second primary being connected between a center tap on said secondary of said first transformer and a point in said series circuit between said A. C. coil and said resistor, a pair of gas-filled grid-controlled rectifier tubes coupled in full-wave rectifier relation with their grids connected to the two terminals of the secondary of said second transformer, a third A. C. transformer having a primary connected to said A. C. source and a secondary provided with a midpoint and two terminals, said last named terminals being connected respectively to the plates of said rectifier tubes, a connection between the cathodes of said rectifier tubes and the midpoint of the secondary of said second transformer, and connections from said midpoints of said second and third transformers to said means responsive to variation in D. C. control voltage, whereby the speed of said motor corresponding to any preselected value of said biasing voltage will be maintained substantially constant.

10. In a system for controlling the speed of an A. C. induction motor operable from an A. C. source, means for generating a D. C. control voltage which is substantially proportional to the speed of said motor, means responsive to variation in D. C. voltage for controlling the A. C. voltage applied from said source to said motor, and a coupling system connected between said D. C. voltage generating means and said responsive means including, a first vacuum tube amplifier having grid and plate circuits, an adjustable biasing voltage effectively connected in series with said control voltage, the resultant of said two voltages being effective to bias said grid circuit, a second vacuum tube amplifier having grid and plate circuits, a source of D. C. potential, a connection from the plate of said first amplifier tube to a positive terminal of said source, a connection from the grid of said second amplifier tube to a terminal of said source more negative than said positive terminal, and a connection from the plate of said first amplifier tube to the cathode of said second amplifier tube, a saturable core reactor having a D. C. coil and an A. C. winding, said D. C. coil being connected in the plate circuit of said second amplifier tube, a first A. C. transformer having a primary winding connected to said source and a secondary winding which is connected in a series circuit including said A. C. winding and a resistor, a second A. C. transformer having a primary and a secondary, said second primary being connected between a center tap on said secondary of said first transformer and a point in said series circuit between said A. C. coil and said resistor, a pair of gas-filled grid-controlled rectifier tubes coupled in full-wave rectifier relation with their grids connected to the two terminals of the secondary of said second transformer, a third A. C. transformer having a primary connected to said source and a secondary provided with a midpoint and two terminals, said last-named terminals being connected respectively to the plates of said rectifier tubes, a connection between the cathodes of said rectifier tubes and the midpoint of the secondary of said second transformer and connections from said midpoints of said second and third transformers to said means responsive to variation in D. C. control voltage, whereby the speed of said motor corresponding to any preselected value of said biasing voltage will be maintained substantially constant.

11. In a system for controlling the speed and direction of rotation of a multi-phase A. C. induction motor having a winding for each phase, a first set of saturable core reactors, each reactor having an A. C. winding and a D. C. coil, the A. C. winding of each reactor being connected between one phase of the line and one of said motor windings, respectively, a D. C. source and a first D. C. control device adjustable in a first direction to increase the current therethrough, the D. C. coils of said reactors being connected to said D. C. source and to said control device, a second set of saturable core reactors similar to those of said first set, the A. C. winding of each of said second set of reactors being also connected between one phase of the line and one of said motor windings, respectively, said second set of A. C. windings being connected to said phases in reverse order with respect to those of said first set, a second D. C. control device adjustable in said first direction to decrease the current therethrough, the D. C. coils of said second set of reactors being connected to said D. C. source and to said second control device, each of said D. C. control devices being provided with means which maintains the current through one set of said D. C. coils substantially constant at a minimum value whilst the current through the other set of said D. C. coils is adjusted over a speed-control range, and unicontrol means for simultaneously adjusting said D. C. control devices corresponding to motor rotation in either direction.

12. In a system for controlling the speed and direction of rotation of a multi-phase A. C. induction motor having a winding for each phase, a first set of saturable core reactors, each reactor having an A. C. winding and a D. C. coil, the A. C. winding of each reactor being connected between one phase of the line and one of said motor windings, respectively, a D. C. source and a first D. C. control device adjustable in a first direction to increase the current therethrough, the D. C. coils of said reactors being connected in series between said D. C. source and said control device, a second set of saturable core reactors similar to those of said first set, the A. C. winding of each of said second set of reactors being also connected between one phase of the line and one of said motor windings, respectively, said second set of A. C. windings being connected to said phases in reverse order with respect to those of said first set, a second D. C. control device adjustable in said first direction to decrease the current therethrough, the D. C. coils of said second set of reactors being connected in series between said D. C. source and said second control device, each of said D. C. control devices comprising a similar rheostat having a high resistance element and a low resistance element connected in series, two adjustable contact members one for each of said series-connected elements, a connection from each of said contact members to one terminal of the series-connected D. C. coils of one set respectively, a connection from the other terminals of said D. C. coils to one terminal of said D. C. source, a connection from the terminals of both high resistance elements to the other terminal of said D. C. source, and uni-control means coupling both of said contact members so that only one of said members is in contact with a low-resistance element at a time, whereby the D. C. current in the first set of D. C. coils is maintained substantially constant at a minimum value whilst the D. C. current in the second set of D. C. coils is varied over a speed-control range from and to a minimum value, and vice versa.

13. In a system for preselecting any speed of an A. C. induction motor over a large range and automatically maintaining the selected speed with varying load, a source of A. C. power for said motor, said motor having as many windings as there are phases of said source, means for generating a speed-responsive voltage which is a function of the speed of said motor, speed-selecting means including a source of adjustable reference voltage connected in said system effectively in series with said speed-responsive voltage so as to produce a resultant voltage comprising the algebraic sum of said speed-responsive voltage and said reference voltage, a saturable core reactor having an A. C. coil connected between each phase of said source and a corresponding motor winding, by which a balanced voltage is applied to the motor so as to produce a single revolving magnetic field, said reactor having a D. C. winding associated therewith, and means continuously controlled by said resultant voltage so as automatically to adjust the current in said D. C. winding and thereby the balanced A. C. voltage applied to said motor as a function of said resultant voltage to a value which maintains the preselected motor speed substantially constant.

14. In a system for preselecting any speed of an A. C. induction motor over a large range and automatically maintaining the selected speed with varying load, a source of A. C. power for said motor, said motor having as many windings as there are phases of said source, means including a generator driven by said motor for generating a D. C. speed-responsive voltage which is substantially proportional to the speed of said motor, speed-selecting means including a source of adjustable D. C. reference voltage connected in said system effectively in series with said speed-responsive voltage so as to produce a resultant voltage comprising the algebraic sum of said speed-responsive voltage and said reference voltage, and a saturable core reactor having an A. C. coil connected between each phase of said source and a corresponding motor winding by which a balanced voltage is applied to the motor so as to produce a single revolving magnetic field, said reactor having a D. C. winding associated therewith, and means continuously controlled by said resultant voltage so as automatically to adjust the current in said D. C. winding and thereby the balanced A. C. voltage applied to said motor substantially in proportion to variations in said resultant voltage to a value which maintains the motor speed substantially constant and proportional to said selected reference voltage.

15. In a system for automatically maintaining the speed of an A. C. induction motor at any preselected speed, the combination which includes, an A. C. induction motor proportioned in respect to its load so as to operate at substantially one-third of its normal single-speed motor rated torque, and proportioned in respect to its rotor resistance so as to operate at its minimum running speed at a current which will not exceed its normal single-speed motor rated current and at a maximum speed of approximately ninety percent of its synchronous speed, a source of alternating-current power for providing a balanced voltage connectible to operate said motor, said motor having as many stator windings as there are phases of said source, and means for controlling the motor speed by varying the balanced voltage applied to said motor comprising saturable core reactor means connected between each phase of said power source and a corresponding stator winding of said motor by which said balanced voltage is applied to the motor so as to produce a single revolving magnetic field, a D. C. winding in each reactor means, a source of control voltage generated as a function of the speed of said motor, a source of adjustable reference voltage, a circuit element in which said control and reference voltages are combined to form effectively a different voltage, an adjustable source of direct current connected to the D. C. winding of each saturable core reactor means so as to vary the effective impedance thereof equally in each phase, and circuit means coupling said circuit element to the adjusting means for said source of direct current for automatically adjusting the magnitude of said direct current in response to changes in said difference voltage by which the current in each D. C. winding is automatically adjusted as a function of said difference voltage to a value which maintains the effective impedance of all said reactor means, and thus of the balanced A. C. voltage applied to said motor, at a magnitude which maintains the motor speed at any desired rate preselectable by adjustment of said reference voltage.

16. In a system for automatically maintaining the speed of an A. C. induction motor at any preselected speed, the combination which includes, an A. C. induction motor proportioned in respect to its load so as to operate at less than its normal single-speed motor rated torque, and proportioned in respect to its rotor resistance so as to operate at its minimum running speed at a current which will not exceed its normal single-speed motor rated current and at a maximum speed of approximately ninety percent of its synchronous speed, a source of alternating-current power for providing a balanced voltage connectible to operate said motor, said motor having as many stator windings as there are phases of said source, and means for controlling the motor speed by varying the balanced voltage applied to said motor comprising saturable core reactor means connected between each phase of said power source and a corresponding stator winding of said motor by which said balanced voltage is applied to the motor so as to produce a single revolving magnetic field, a D. C. winding in each reactor means, a source of control voltage generated as a function of the speed of said motor, a source of adjustable reference voltage, a circuit element in which said control and reference voltages are combined to form effectively a difference voltage, an adjustable source of direct current connected to the D. C. winding of each saturable core reactor means so as to vary the effective impedance thereof equally in each phase, and circuit means coupling said circuit element to the adjusting means for said source of direct current for automatically adjusting the magnitude of said direct current in response to changes in said difference voltage by which the current in each D. C. winding is automatically adjusted as a function of said difference voltage to a value which maintains the effective impedance of all said reactor means, and thus of the balanced A. C. voltage applied to said motor, at a magnitude which maintains the motor speed at any desired rate preselectable by adjustment of said reference voltage.

17. In a system for preselecting any speed of an A. C. induction motor over a large range in speed and automatically maintaining the selected speed, a source of alternating-current power for providing a balanced voltage connectible to operate said motor, said motor having as many stator windings as there are phases of said source, and means for controlling the motor speed by varying the balanced voltage applied to said motor comprising saturable core reactor means including a coil connected between each phase of said power source and a corresponding stator winding of said motor by which said balanced voltage is applied to the motor so as to produce a single revolving magnetic field, a D. C. winding associated with each reactor means, a source of control voltage generated as a function of the speed of said motor, a source of adjustable reference voltage, a circuit element in which said control and reference voltages are combined to form effectively a difference voltage, a source of direct current connected to said D. C. windings, means for adjusting said direct current so as to vary the effective impedance of said reactor means equally in each phase, and circuit means coupling said circuit element to the adjusting means for said direct current for automatically adjusting the magnitude of said direct current in response to changes in said difference voltage by which the current in each D. C. winding is automatically adjusted as a function of said difference voltage to a value which maintains the effective impedance of said reactor means, and thus of the balanced A. C. voltage applied to said motor, at a magnitude which maintains the motor speed at any desired rate preselectable by adjustment of said reference voltage.

18. In combination, a multi-phase alternating-current motor having a high-resistance rotor substantially as described, a multi-phase source of alternating-current power for providing a balanced voltage connectible to operate said motor, similar saturable core reactor means including a coil connected in each phase between said power source and said motor by which a balanced voltage is applied to the motor so as to produce a single revolving magnetic field, a D. C. winding associated with each said reactor means, a source of control voltage generated in proportion to the speed of said motor, a source of adjustable reference voltage, a circuit element in which said control and reference voltages are combined to form effectively a difference voltage, a source of direct current connectible to the D. C. windings of said saturable core reactor means so as to control the effective impedance of said reactor means, circuit means coupling said circuit element to said source of direct current and operative automatically to adjust the magnitude of said direct current in response to changes in said difference voltage by which the current in said D. C. windings is automatically adjusted as a function of said difference voltage to a value which maintains the effective impedance of said reactor means, and thus the balanced A. C. voltage applied to said motor, at a magnitude which maintains the motor speed at a rate determined by the adjusted value of said reference voltage.

19. In a system for controlling the speed and direction of rotation of a multi-phase A. C. induction motor having a winding for each phase, a first set of saturable core reactors including an A. C. winding for each phase and D. C. coil means associated therewith, one each of said A. C. windings being connected between each phase of the line and one each of said motor windings, respectively, a second set of saturable core reactors similar to those of said first set including an A. C. winding for each phase and D. C. coil means associated therewith, the A. C. windings of each of said second set of reactors being also connected between each phase of the line and one each of said motor windings, respectively, said second set of windings being connected to said phases in reverse order with respect to those of said first set, means automatically generating a D. C. control voltage which is a function of the speed of said motor, speed and direction-of-rotation selecting means including a first source of adjustable D. C. reference voltage connected in series with the effective output of said control voltage generator so as to produce a resultant voltage comprising the algebraic sum of said control voltage and said reference voltage, circuit means including amplifier means having a control element and a unidirectional current output connected to energize the D. C. coil means of the first set of said reactors, coupling means effectively coupling said resultant voltage to said control element of said amplifier means so that the unidirectional current in said D. C. coil means is automatically adjusted substantially in proportion to the magnitude of said resultant voltage to a value which maintains the effective impedance of said first set of reactors, and thus the balanced A. C. voltage applied to said motor, at a magnitude which maintains the motor speed substantially proportional to the preselected value of said reference voltage, and second circuit means similar to said first-named circuit means similarly connected to the D. C. coil means of said second set of reactors including a second source of adjustable reference voltage, said selecting means being arranged to simultaneously adjust said first reference voltage to said preselected value whilst maintaining the second reference voltage at a predetermined minimum value, and vice versa with respect to operation of said motor in the reverse direction.

20. A circuit for controlling the direction and speed of rotation of a multi-phase induction motor comprising a multi-phase power circuit for the motor; a first and a second set of windings, one winding of each set being connected in series with the motor in each line wire of the power circuit, with the windings of the different sets being connected in an altered manner so as to control the phase sequence of the voltage applied to the motor to govern the direction of rotation thereof, each of said windings normally having a high impedance preventing the application of any effective voltage on the motor; a means for each set of windings operable upon energization to reduce the impedance of the windings of the set with which it is associated in proportion to the degree of energization of the means, and control circuit means for selectively and variably energizing said first mentioned means, said control circuit means including adjustable means for generating signals in said control circuit corresponding to the desired direction and speed of rotation of the motor and operation responsive means operable to generate signals of a character and magnitude corresponding to the direction and speed of rotation of the motor and electrically interconnected in said control circuit means to maintain operation of the motor at a speed substantially as called for by the adjustable means.

21. A circuit for controlling the speed and direction of rotation of a multiphase induction motor, comprising a multiphase power source for the motor, said motor having as many windings as there are phases of said source, a plurality of reactors, each reactor including A. C. windings connected between each phase of said source and a corresponding winding of said motor, said A. C. windings being arranged in two sets, the windings of the different sets being connected in an altered manner so as to control the phase sequence of the voltage applied to the motor to govern the direction of rotation thereof, said A. C. windings normally having a high impedance preventing the application of any effective voltage on the motor, D. C. coil means associated with each set of A. C. windings operable upon energization to reduce the impedance of the A. C. windings of the set with which said D. C. coil means is associated in proportion to the degree of energization of said D. C. coil means, control circuit means for selectively and variably energizing said D. C. coil means, said control circuit means including adjustable means for generating singals in said control circuit corresponding to the desired direction and speed of rotation of the motor, and operation-responsive means operable to generate signals of a magnitude corresponding to the speed of rotation of the motor and electrically interconnected in said control circuit means to maintain operation of the motor at a speed substantially as called for by the adjustable means.

22. A circuit for controlling the speed of rotation of an A. C. induction motor, comprising an A. C. power source for the motor, said motor having as many windings as there are phases of said source, a reactor including an A. C. winding connected between each phase of said source and a corresponding winding of said motor, each A. C. winding normally having a high impedance preventing the application of any effective voltage on said motor, D. C. coil means associated with said A. C. windings operable upon energization to reduce the impedance of each A. C. winding in proportion to the degree of energization of the D. C. coil means, control circuit means for variably energizing said D. C. coil means, said control circuit means including adjustable means for generating signals in said control circuit corresponding to the desired speed of rotation of the motor, and operation-responsive means operable to generate signals of a magnitude corresponding to the speed of rotation of the motor and electrically interconnected in said control circuit means to maintain operation of the motor at a speed substantially as called for by the adjustable means.

23. In a system for preselecting any speed of an A. C. induction motor over a large range and automatically maintaining the selected speed with varying load, a source of A. C. power for said motor, said motor having as many windings as there are phases of said source, means for generating a speed-responsive voltage which is a function of the speed of said motor, speed-selecting means including a source of adjustable reference voltage connected in said system effectively in series with said speed-responsive voltage so as to produce a resultant voltage comprising the algebraic sum of said speed-responsive voltage and said reference voltage, saturable core reactor means having an A. C. winding connected between each phase of said source and a corresponding motor winding, by which a balanced voltage is applied to the motor so as to produce a single revolving magnetic field, each A. C. winding normally having a high impedance preventing the application of any effective voltage on said motor, said reactor means having a D. C. winding associated therewith, and means continuously controlled by said resultant voltage so as automatically to adjust the current in said D. C. winding and thereby the balanced A. C. voltage applied to said motor as a function of said resultant voltage to a value which maintains the preselected motor speed substantially constant.

24. In a system for preselecting any speed of an A. C. induction motor over a large range in speed and automatically maintaining the selected speed, a source of alternating-current power for providing a balanced voltage to operate said motor, said motor having as many windings as there are phases of said source, means for controlling the motor speed by varying the balanced voltage applied to said motor comprising saturable core reactor means including an A. C. winding connected between each phase of said power source and a corresponding winding of said motor by which said balanced voltage is applied to the motor so as to produce a single revolving magnetic field, each A. C. winding normally having a high impedance preventing the application of any effective voltage on said motor, a D. C. winding associated with each reactor means, a source of control voltage generated as a function of the speed of said motor, a source of adjustable reference voltage, a circuit element in which said control and reference voltages are combined to form effectively a difference voltage, a source of direct current connected to each D. C. winding, means for adjusting said direct current so as to vary the effective impedance of said reactor means equally in each phase, and circuit means coupling said circuit element to the adjusting means for said direct current for automatically adjusting the magnitude of said direct current in response to changes in said difference voltage by which the current in said D. C. winding is automatically adjusted as a function of said difference voltage to a value which maintains the effective impedance of said reactor means, and thus of the balanced A. C. voltage applied to said motor, at a magnitude which maintains the motor speed at any desired rate preselectable by adjustment of said reference voltage.

25. In combination, a multiphase alternating-current motor having a high-resistance rotor substantially as described, a source of multiphase alternating-current power for providing a balanced voltage to operate said motor, saturable core reactor means including an A. C. winding connected in each phase between said power source and said motor by which a balanced voltage is applied to the motor so as to produce a single revolving magnetic field, a D. C. winding associated with each said reactor means, a source of control voltage generated in proportion to the speed of said motor, a source of adjustable reference voltage, a circuit element in which said control and reference voltages are combined to form effectively a difference voltage, a source of direct current connected to the D. C. windings of said reactor means, and means for adjusting said direct current so as to vary the effective impedance of said reactor means, circuit means coupling said circuit element to said source of direct current and for automatically adjusting the magnitude of said direct current in response to changes in said difference voltage by which the current in said D. C. windings is automatically adjusted as a function of said difference voltage to a value which maintains the effective impedance of said reactor means, and thus the balanced A. C. voltage applied to said motor, at a magnitude which maintains the motor speed at a rate determined by the adjusted value of said reference voltage.

26. A circuit for controlling the rotation of an A. C. induction motor, comprising an A. C. power source for the motor, said motor having as many windings as there are phases of said source, a reactor including an A. C. winding connected between each phase of said source and a corresponding winding of said motor, each A. C. winding normally having a high impedance preventing the application of any effective voltage on said motor, D. C. coil means associated with each A. C. windings operable upon energization to reduce the impedance of each A. C. winding in proportion to the degree of energization of the D. C. coil means, control circuit means for variably energizing said D. C. coil means, said control circuit means including adjustable means for generating signals in said control circuit corresponding to the desired speed of rotation of the motor, operation-responsive means including direct-current generator means driven by said motor and operable to generate signals of a magnitude and polarity corresponding respectively to the speed and direction of rotation of the motor and electrically interconnected in said control circuit means to maintain operation of the motor at a speed substantially as called for by the adjustable means.

27. A circuit for controlling the speed and direction of rotation of a multiphase induction motor having a high resistance secondary, comprising a multiphase power source for the motor, said motor having as many windings as there are phases of said source, a plurality of reactors, each reactor including A. C. windings connected between each phase of said source and a corresponding winding of said motor, said A. C. windings being arranged in two sets, the windings of the different sets being connected in an altered manner so as to control the phase sequence of the voltage applied to the motor to govern the direction of rotation thereof, said A. C. windings normally having a high impedance preventing the application of any effective voltage on the motor, D. C. coil means associated with each set of A. C. windings, each coil means being operable upon energization to reduce the impedance of the A. C. windings of the set with which it is associated in proportion to the degree of its energization, control circuit means for selectively and variably energizing said D. C. coil means, said control circuit means including adjustable means for generating signals in said control circuit means corresponding to the desired direction and speed of rotation of the motor, and operation-responsive means operable to generate signals of a magnitude corresponding to the speed of rotation of the motor and electrically interconnected in said control circuit means to maintain operation of the motor at a speed substantially as called for by the setting of the adjustable means.

References Cited in the file of this patent

UNITED STATES PATENTS

| Number | Name | Date |
| --- | --- | --- |
| 609,990 | Lamme | Aug. 30, 1898 |
| 762,738 | Meyer | June 14, 1904 |
| 1,376,453 | Meyer | May 3, 1921 |
| 1,719,492 | Stoller | July 2, 1929 |
| 1,787,133 | Wilson | Dec. 30, 1930 |
| 1,831,069 | Higbee | Nov. 10, 1931 |
| 1,844,704 | Thompson | Feb. 9, 1932 |
| 1,894,928 | Wesche | Jan. 17, 1933 |
| 1,947,677 | Seeger et al. | Feb. 20, 1934 |
| 1,955,322 | Brown | Apr. 17, 1934 |
| 2,078,880 | Logan | Apr. 27, 1937 |
| 2,102,911 | Perry | Dec. 21, 1937 |
| 2,228,078 | Gulliksen | Jan. 7, 1941 |
| 2,299,911 | Logan | Oct. 27, 1942 |
| 2,440,319 | Wickerham | Apr. 27, 1948 |